US012633306B1

(12) United States Patent
Suzuki et al.

(10) Patent No.: US 12,633,306 B1
(45) Date of Patent: May 19, 2026

(54) MAGNETIC DISK DEVICE AND METHOD

(71) Applicants:KABUSHIKI KAISHA TOSHIBA, Tokyo (JP); TOSHIBA ELECTRONIC DEVICES & STORAGE CORPORATION, Tokyo (JP)

(72) Inventors: Sho Suzuki, Tokyo (JP); Takeyori Hara, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/190,339

(22) Filed: Apr. 25, 2025

(30) Foreign Application Priority Data

Jan. 23, 2025 (JP) ................................. 2025-009796

(51) Int. Cl.
G11B 5/55 (2006.01)
(52) U.S. Cl.
CPC .................................. G11B 5/5547 (2013.01)
(58) Field of Classification Search
CPC .......... G11B 2005/0021; G11B 5/5582; G11B 5/5578; G11B 5/4833; G11B 5/4813; G11B 5/5547; G11B 5/5847; G11B 5/55; G11B 19/28; G11B 21/12; G11B 5/54; G11B 21/025; G11B 5/012; G11B 21/02; G11B 21/022
See application file for complete search history.

(56) References Cited

U.S. PATENT DOCUMENTS

| | | |
|---|---|---|
| 6,169,382 B1 | 1/2001 | McKenzie et al. |
| 6,968,422 B1 | 11/2005 | Codilian et al. |
| 6,987,639 B1 | 1/2006 | Yu |
| 6,993,624 B2 | 1/2006 | Hall |
| 7,471,486 B1 | 12/2008 | Coker et al. |
| 9,947,352 B1 * | 4/2018 | Sudo .................... G11B 5/5547 |

* cited by examiner

*Primary Examiner* — Nabil Z Hindi
(74) *Attorney, Agent, or Firm* — Knobbe, Martens, Olson & Bear, LLP

(57) ABSTRACT

According to the embodiment, a controller of a magnetic disk device executes, for each of unexecuted commands, a first operation to estimate a seek time for executing a corresponding command. The first operation includes acquiring a first force constant of the motor and a second force constant of the motor, and estimating a seek time based on the first and second force constants and a seek distance. The first force constant is determined when the magnetic head is at a start position of a seek operation. The second force constant is determined when the magnetic head is at an end position of the seek operation. The controller determines a command to be executed first out of the unexecuted commands based on the estimated value of the seek time obtained by the first operation for each of the unexecuted commands.

20 Claims, 9 Drawing Sheets

MAGNETIC DISK
1

SERVO AREA
15

DATA AREA
16

TRACK
17

HEAD MOVING
DIRECTION

AA

4

DR

33D 31   32D

3

Y

Z   X

MAGNETIC DISK DEVICE AND METHOD

CROSS-REFERENCE TO RELATED APPLICATIONS

This application is based upon and claims the benefit of priority from Japanese Patent Application No. 2025-009796, filed on Jan. 23, 2025; the entire contents of which are incorporated herein by reference.

FIELD

Embodiments described herein relate generally to a magnetic disk device and a method.

BACKGROUND

In a recent magnetic disk device, when a plurality of commands is received from a host, a command reordering operation is executed in order to shorten a total time required to execute the received commands. In the command reordering operation, when there are unexecuted commands, an access time including a time required for a seek operation is estimated for each command, and a command to be executed next is selected based on an estimated value of the access time.

DETAILED DESCRIPTION

According to the present embodiment, a magnetic disk device includes a magnetic disk, a magnetic head, a motor, a first memory, and a controller. The magnetic head is configured to access the magnetic disk. The motor is configured to execute a seek operation to move the magnetic head in a radial direction of the magnetic disk. The first memory is configured to store commands, each being unexecuted and each requesting an access to the magnetic disk. The controller is configured to execute, for each of the commands, a first operation to estimate a first time required for a seek operation for executing a corresponding command. The first operation includes acquiring a first force constant and a second force constant. The first force constant is a force constant of the motor determined when the magnetic head is at a start position of the seek operation for executing the corresponding command. The second force constant is a force constant of the motor determined when the magnetic head is at an end position of the seek operation for executing the corresponding command. The first operation includes estimating the first time based on the first force constant, the second force constant, and a first distance being a movement distance of the magnetic head by the seek operation for executing the corresponding command. The controller is configured to determine a command to be executed first out of the commands based on an estimated value of the first time obtained by the first operation executed for each of the commands.

Hereinafter, a magnetic disk device and a method according to the embodiment will be described in detail with reference to the accompanying drawings. Note that the present disclosure is not limited by these embodiments.

First Embodiment

Hereinafter, a magnetic disk device according to an embodiment will be described in detail with reference to the accompanying drawings. The present disclosure is not limited by the following embodiment.

Figure 1:
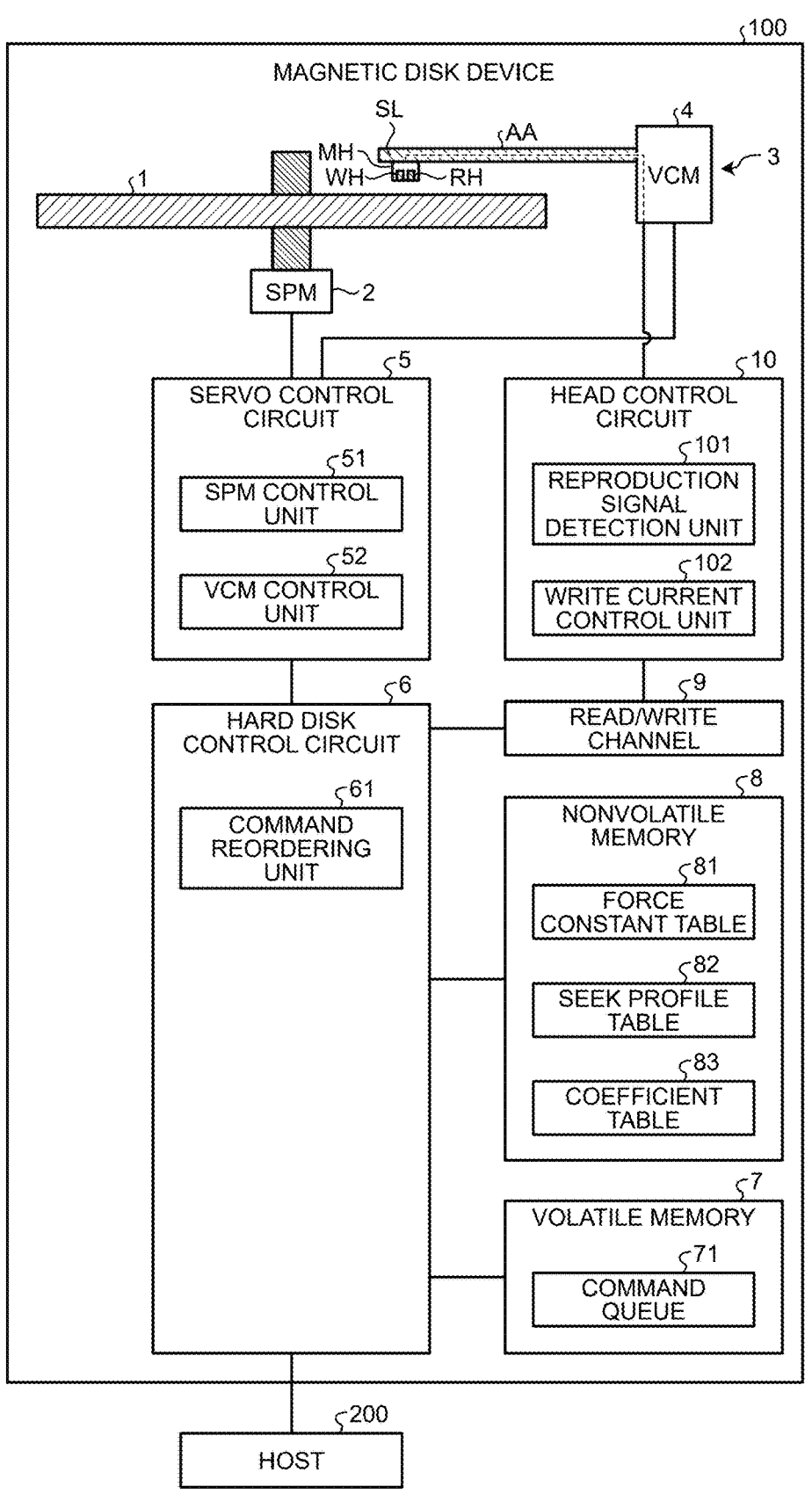
FIG. 1 is a block diagram illustrating an example of a configuration of a disc device according to the first embodiment.

FIG. 1 is a block diagram illustrating an example of a configuration of a disc device according to the first embodiment. A magnetic disk device 100 can be connected to a host 200. The magnetic disk device 100 functions as an external storage device of the host 200. The magnetic disk device 100 can receive an access command such as a write command or a read command from the host 200.

The magnetic disk device 100 includes a magnetic disk 1, a spindle motor (SPM) 2, a magnetic head M H, an actuator arm AA, a voice coil motor (VCM) 3, a servo control circuit 5, a hard disk control circuit 6, a volatile memory 7, a nonvolatile memory 8, a read/write channel 9, and a head control circuit 10.

The magnetic disk device 100 receives an access command from the host 200. The magnetic disk device 100 writes data to the magnetic disk 1 or reads data from the magnetic disk 1 in accordance with the received access command. The access command includes address information. The address information is information indicating a position in an address space provided by the magnetic disk device 100 to the host 200.

A magnetic layer capable of recording various types of information is provided on the surface of the magnetic disk 1. The magnetic disk device 100 may include one magnetic disk 1 or may include two or more magnetic disks 1 provided coaxially. In FIG. 1, only one magnetic disk 1 is illustrated for simplification of the description.

Figure 2:
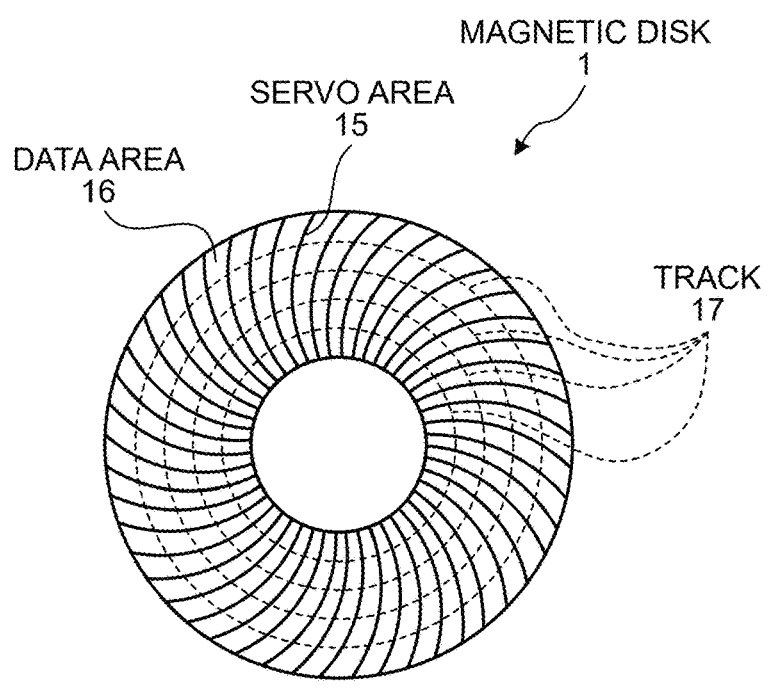
FIG. 2 is a diagram illustrating an example of a configuration of a magnetic disk according to the first embodiment.

FIG. 2 is a diagram illustrating an example of a configuration of the magnetic disk 1 of the first embodiment. Servo data used for positioning the magnetic head M H is written to the magnetic layer formed on the surface of the magnetic disk 1 by, for example, a servo writer or self-servo write (SSW). The servo data includes a servo mark, a gray code, a burst pattern, and a post code.

FIG. 2 illustrates servo areas 15 disposed radially as an example of the arrangement of servo areas to which servo data is written. In the circumferential direction, a space between the two servo areas 15 is a data area 16 where data can be written. A plurality of concentric tracks 17 is provided in the radial direction of the magnetic disk 1. A plurality of sectors in which data can be written is provided in a section divided by the data area 16 on each track 17.

The address space described above is mapped to the group of sectors provided in the magnetic disk 1. In response to an access command from the host 200, the magnetic disk device 100 accesses a sector corresponding to address information included in the access command. The access is an access for write or read.

When data is written to the magnetic disk 1 or data is read from the magnetic disk 1, positioning control of the magnetic head MH, namely, control of a seek operation and control of a tracking operation are executed based on servo data read from the servo area 15 by the magnetic head M H. The seek operation is an operation to move the magnetic head M H in the radial direction toward the target track 17. The tracking operation is an operation to keep the magnetic head M H on the target track 17 after being moved onto the target track 17. The position of the magnetic head M H can be uniquely indicated using a radial position (that is, a certain track 17) on the magnetic disk 1. A radial position of the magnetic head M H on the magnetic disk 1 is simply expressed as a radial position of the magnetic head M H.

Hereinafter, data requested to be written by the write command is referred to as write data. In addition, data that is requested to be read by the read command and is read from the magnetic disk 1 is referred to as read data.

The description returns to FIG. 1. As described above, write and read of data to and from the magnetic disk 1 are performed via the magnetic head M H. The magnetic head M H is provided at one end of the actuator arm AA, and executes writing and reading of data to the magnetic disk 1. The magnetic head M H includes a write head WH that writes data to the magnetic disk 1 and a read head RH that reads data from the magnetic disk 1. The magnetic head M H is supported on a slider SL.

The SPM 2 rotates the magnetic disk 1. The magnetic head M H moves relative to the surface of the magnetic disk 1 in the circumferential direction while keeping a slightly floating state from the surface of the magnetic disk 1 by the lift generated by the rotation of the magnetic disk 1.

The VCM 3 is provided at an end, of the actuator arm AA, opposite to the end where the magnetic head M H is provided. The VCM 3 rotationally drives the actuator arm AA about a shaft 4. As a result, the VCM 3 moves the magnetic head M H relative to the magnetic disk 1 in the radial direction.

The head control circuit 10 includes a reproduction signal detection unit 101 and a write current control unit 102. The write current control unit 102 generates a current with a waveform corresponding to data input from the read/write channel 9. The write current control unit 102 executes data writing on the magnetic disk 1 by causing the generated current to flow through the write head WH. The reproduction signal detection unit 101 amplifies the read signal output from the read head RH and supplies the amplified read signal to the read/write channel 9.

The volatile memory 7 is a volatile memory capable of high-speed operation. The volatile memory 7 temporarily stores write data received from the host 200 and read data read from the magnetic disk 1. Thus, the volatile memory 7 is used as a buffer area for write data and read data.

The volatile memory 7 may include an area in which various pieces of data or programs used by the hard disk control circuit 6 and the like are loaded.

The volatile memory 7 is provided with a command queue 71. The command queue 71 is a storage area in which an access command received from the host 200 is temporarily stored.

The read/write channel 9 performs code-modulation on the write data stored in the volatile memory 7 and outputs the code-modulated write data to the head control circuit 10. In addition, the read/write channel 9 performs code-demodulation on data supplied from the head control circuit 10 and stores the code-demodulated data in the volatile memory 7 as read data.

In the nonvolatile memory 8, various pieces of data and programs used by the hard disk control circuit 6 are stored in advance. The various pieces of data and programs previously stored in the nonvolatile memory 8 are loaded into the volatile memory 7 at the time of activation, for example. The hard disk control circuit 6 uses the various pieces of data and programs loaded into the volatile memory 7.

The various pieces of data stored in the nonvolatile memory 8 in advance include a force constant table 81, a seek profile table 82, and a coefficient table 83. Details of these tables will be described later.

The servo control circuit 5 includes an SPM control unit 51 and a VCM control unit 52.

The SPM control unit 51 supplies power to the SPM 2. The SPM control unit 51 adjusts the power supplied to the SPM 2, thereby controlling the rotation of the SPM 2.

The VCM control unit 52 supplies power to the VCM 3. The VCM control unit 52 adjusts the power supplied to the VCM 3, thereby controlling the rotation of the VCM 3.

The hard disk control circuit 6 receives a command including an access command from the host 200 and makes a response to the command to the host 200.

For example, when the hard disk control circuit 6 receives a write command from the host 200, the hard disk control circuit 6 stores, in the volatile memory 7, the write data requested to be written by the write command and stores the write command in the command queue 71. When the hard disk control circuit 6 receives a read command from the host 200, the hard disk control circuit 6 stores the read command in the command queue 71. The hard disk control circuit 6 sequentially executes one or more access commands stored in the command queue 71.

In a case where a read command is stored in the command queue 71 and the read command is executed, the hard disk control circuit 6 executes the read operation on the magnetic disk 1 in accordance with the read command. When the read data is stored in the volatile memory 7 by the read operation, the read data is transferred from the volatile memory 7 to the host 200.

When a write command is stored in the command queue 71 and the write command is executed, the hard disk control circuit 6 executes a write operation to write, to the magnetic disk 1, the write data that is stored in the volatile memory 7 and is requested to be written by the write command.

The hard disk control circuit 6 erases the access command stored in the command queue 71 at a predetermined timing, for example, a timing when execution of the access command is completed.

The hard disk control circuit 6 includes a command reordering unit 61. When one or more unexecuted access commands are stored in the command queue 71, the command reordering unit 61 determines the execution order of the one or more access commands. In particular, when plural unexecuted access commands are stored in the command queue 71, the command reordering unit 61 executes the command reordering operation.

The command reordering operation is an operation to select an access command, which corresponds to a short access time required for execution, as an access command to be preferentially executed next from among the unexecuted access commands.

The access time is equivalent to the sum of the seek time and the rotational latency. The seek time is a time required for the seek operation. The waiting for rotation is an operation to wait for an access until the magnetic head M H reaches the access destination sector after the seek operation is completed. The rotational latency is a time required for waiting for rotation.

The command reordering unit 61 estimates an access time for each unexecuted access command by estimating a seek time and rotational latency for each unexecuted access command, and adds up the estimated values. Then, the command reordering unit 61 determines, as an access command to be executed first, an unexecuted access command corresponding to the smallest estimated value of the access time from among of the unexecuted access commands.

The execution timing of the command reordering operation is designed at any timing. In an example, the command reordering operation is executed before the execution of one access command is completed. Thus, when there are plural unexecuted access commands in the command queue 71 in executing a certain access command, the command reordering unit 61 determines an access command to be executed first out of those unexecuted access commands in the command queue 71 by performing the command reordering operation. In the command reordering operation, the command reordering unit 61 estimates an access time from timing as a starting point at which execution of the running access command is completed. Therefore, it is possible to minimize the time from the completion of execution of the running access command to the start of execution of the next access command. Upon starting the execution of the access command determined as the access command to be executed first, the command reordering unit 61 executes the command reordering operation again to determine an access command to be executed first out of the remaining unexecuted access commands in the command queue 71. Accordingly, every time the access command is executed, the command reordering unit 61 determines an access command to be executed first out of the remaining unexecuted access commands in the command queue 71, based on the estimated value of the access time for each access command.

In the command reordering operation, the command reordering unit 61 may determine not only an access command to be executed first out of unexecuted access commands but also access commands to be executed second and subsequently out of the unexecuted access commands.

In a case that an access command to be executed first out of the unexecuted access commands is determined and a new access command is stored in the command queue 71 before execution of a running access command is completed, the command reordering unit 61 may re-execute the command reordering operation. Alternatively, the command reordering unit 61 may not re-execute the command reordering operation.

In order to increase the effect expected by the command reordering operation, namely, the effect of shortening the total time required to execute the access commands as much as possible, it is required to estimate the access time, in particular, the seek time as accurately as possible.

For example, in a case where the actual seek time is longer than the estimated value of the seek time, the magnetic head passes over a sector as the access destination at the time when the seek operation is completed. Thus, the rotational latency may be increased by a time corresponding to one rotation of the magnetic disk. The actual access time may be significantly longer than the estimated value of the access time. On the other hand, in a case where the actual seek time is shorter than the estimated value of the seek time, the estimated value of the access time is shorter than the actual access time. Thus, there may be a case where an access command with the shortest access time cannot be selected. When the accuracy of estimating the seek time is poor, the number of access commands that can be executed per unit time is reduced. Therefore, there is a possibility that the effect of the command reordering operation to reduce the total time required for execution of the access commands is reduced.

Figure 3:
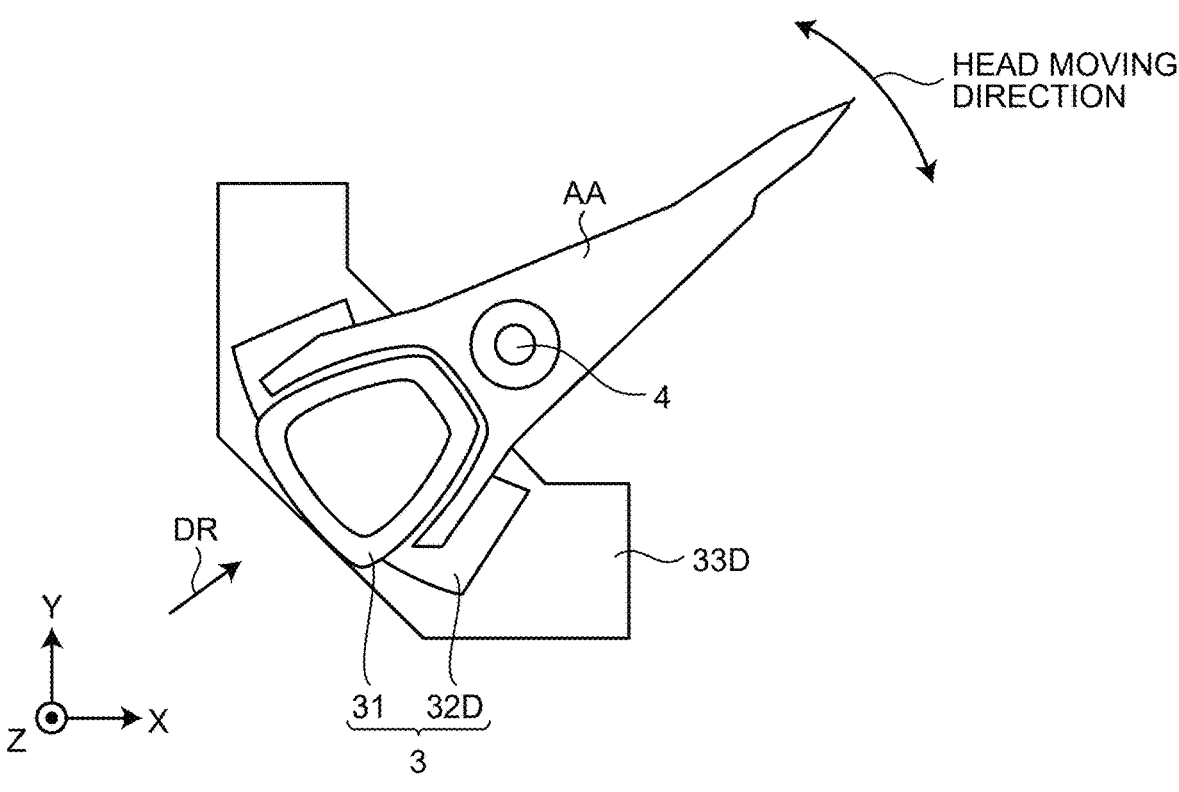
FIG. 3 is a plan view of the VCM according to the first embodiment in a state in which an upper yoke is removed.
Figure 4:
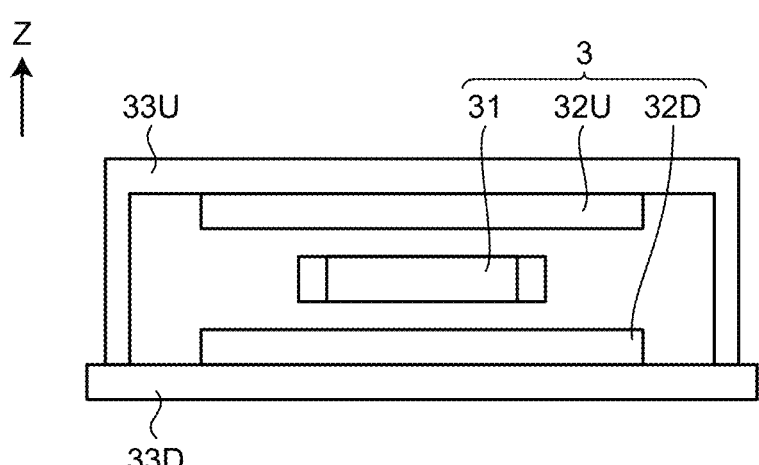
FIG. 4 is a view of the VCM according to the first embodiment when viewed in a direction DR illustrated in FIG. 3 in a state where the upper yoke is attached.

Next, the VCM 3 will be described. FIG. 3 is a plan view of the VCM 3 according to the first embodiment when an upper yoke 33U is removed. FIG. 4 is a view of the VCM 3 according to the first embodiment when viewed in the direction DR illustrated in FIG. 3 in a state where the upper yoke 33U is attached. In the description of FIGS. 3 and 4, for the sake of convenience, a direction in which the shaft 4 being a rotation axis of the actuator arm AA extends is a Z direction. A direction orthogonal to the Z direction is an X direction. A direction orthogonal to the X direction and the Z direction is a Y direction. A side facing the positive direction in the Z direction is defined as an upper side. A side facing the negative direction in the Z direction is defined as a lower side.

As illustrated in FIGS. 3 and 4, the VCM 3 includes a coil 31 provided in the actuator arm AA, a magnet 32U provided on the upper yoke 33U, and a magnet 32D provided on a lower yoke 33D. The magnet 32U and the magnet 32D are provided so as to face each other, whereby a magnetic field in the Z direction is formed between the magnet 32U and the magnet 32D.

The coil 31 is provided between the magnet 32U and the magnet 32D. When the current flows in the coil 31, the coil 31 obtains the thrust in the direction intersecting the magnetic field in the Z direction formed between the magnet 32U and the magnet 32D. This thrust causes the magnetic head M H to move in the radial direction on the magnetic disk 1.

The acceleration of the magnetic head M H caused by the VCM 3 is determined by the magnitude of the current flowing through the coil 31 and a force constant BL. The force constant is a constant caused by the magnetic flux density of the magnet and the effective wire length of the coil in the magnetic flux. In the VCM 3, the force constant BL is not uniform in the movable range of the coil 31. The magnitude of the force constant BL may change with the positional relationship between the magnets 32U and 32D and the coil 31. In the seek operation, the positional relationship between the coil 31 and the magnets 32U and 32D changes with the radial position of the magnetic head M H. Therefore, even when the magnitude of the current flowing to the coil 31 is constant, the acceleration varies with the position of the coil 31 (namely, the position of the magnetic head M H).

Figure 5:
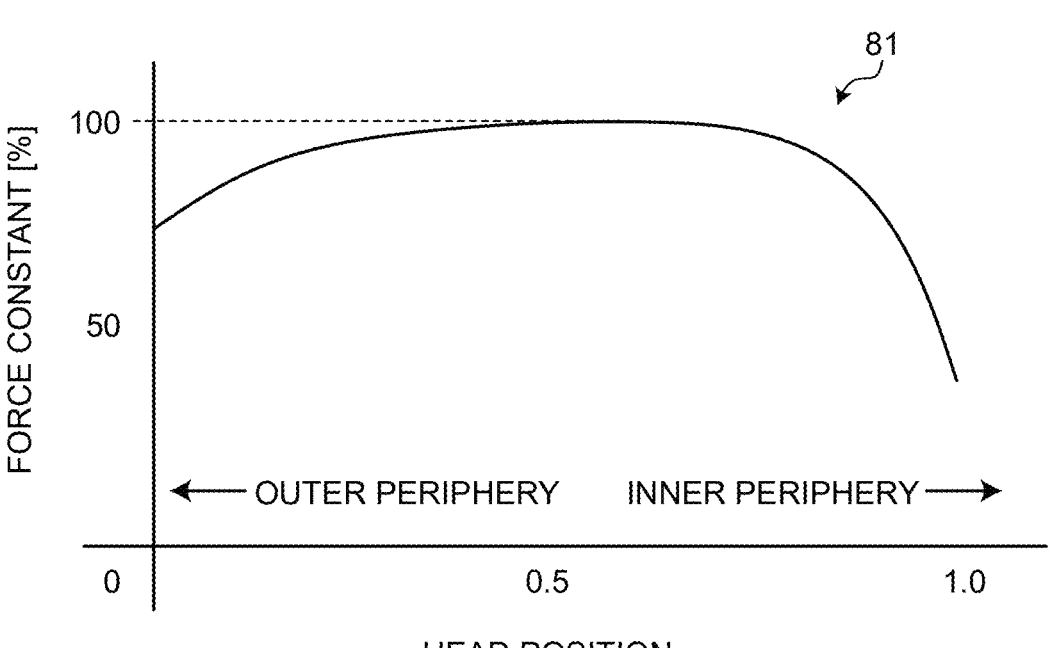
FIG. 5 is a diagram illustrating a relationship between a position of a magnetic head in a radial direction and a force constant, and an example of a configuration of a force constant table according to the first embodiment.

FIG. 5 illustrates a relationship between the position of the magnetic head M H and the force constant BL in the radial direction. In this drawing, the force constant BL is expressed by a percentage that denotes the possible maximum value for the force constant BL as 100%. The position of the magnetic head M H is normalized to numerical information that can take numerical values from 0 to 1, where the radial position of the track 17 at the outermost periphery (outer diameter) is set to 0 and the position of the track 17 at the innermost periphery (inner diameter) is set to 1.

As illustrated in FIG. 5, the force constant BL decreases near the inner periphery of the magnetic disk 1 and near the outer periphery of the magnetic disk 1. This is because, when the magnetic head M H is near the inner periphery and when the magnetic head M H is near the outer periphery, the coil 31 is located at a place where the magnetic flux density of the magnets 32U and 32D is low. When the magnetic head M H is near the inner periphery and when the magnetic head M H is near the outer periphery, the force constant BL decreases. Therefore, in this case, the acceleration of the magnetic head M H decreases, and also the moving speed (seek speed) of the magnetic head M H in the radial direction decreases.

In order to prevent performance deterioration due to decrease in seek speed, correction for increasing the current of the coil 31 is performed at the position of the magnetic head M H where the force constant BL decreases. However, due to physical restriction, there is a maximum value of the current that can flow through the coil 31. This maximum value is referred to as a saturation current. This saturation current depends on a voltage applied to the coil 31, a counter electromotive voltage, a resistance of the coil 31, and the like.

Part of the control of the seek operation is performed based on the acceleration of the magnetic head MH. Therefore, when the current of the coil 31 is saturated, the acceleration of the magnetic head M H cannot reach a desired value, and thereby the control of the seek operation may fail. The counter electromotive force, which is an element for determining the saturation current, is a product of the speed of the magnetic head M H and the force constant BL. Therefore, when the force constant BL is small, the saturation current also has a small value. It can be said that current saturation is likely to occur when the magnetic head M H is at a position where the force constant BL decreases, specifically, near the inner periphery or near the outer periphery. In order to prevent current saturation, the current of the coil 31 is suppressed when the position of the magnetic head M H at the start or end of the seek operation is near the inner periphery or near the outer periphery. As the current of the coil 31 is suppressed, the obtained acceleration also decreases, and thus the seek time is longer.

Since the force constant BL has position dependency, even when the movement distance of the magnetic head M H in the radial direction is common, the seek time may vary with the position of the magnetic head M H at the start or end of the seek operation (more strictly, the position where acceleration or deceleration of the magnetic head M H is performed).

Therefore, in order to estimate the seek time more accurately, the command reordering unit 61 acquires the force constant BL that is determined when the magnetic head M H is at the start position of the seek operation, and acquires the force constant BL that is determined when the magnetic head M H is at the end position of the seek operation. The command reordering unit 61 estimates a seek time based on the acquired force constant BL at each position and the seek distance. The seek distance is a movement distance of the magnetic head M H in the radial direction by the seek operation. In other words, the end position of the seek operation is the radial position of the target track 17.

Hereinafter, the force constant BL when the magnetic head M H is at the start position of the seek operation is referred to as a force constant BLst. The force constant BL when the magnetic head M H is at the end position of the seek operation may be referred to as a force constant BLds.

The force constant table 81, the seek profile table 82, and the coefficient table 83 are setting information used for implementing the operation to estimate the seek time based on the force constant BL when the magnetic head M H is at the start position of the seek operation and the force constant BL when the magnetic head M H is at the end position of the seek operation.

The force constant table 81 is setting information indicating the relationship between the position of the magnetic head M H in the radial direction and the force constant BL. The correspondence illustrated in FIG. 5 is recorded in the force constant table 81. By using the force constant table 81, the command reordering unit 61 acquires the force constant BLst and the force constant BLds.

The seek profile table 82 is setting information representing a correspondence between a seek distance and a seek time. The seek time correlated with the seek distance by the seek profile table 82 is a seek time acquired under a condition that a change in the force constant BL is not considered. For example, in the seek profile table 82, the seek time under the condition that the force constant BL always takes the maximum value is correlated with the seek distance.

Figure 6:
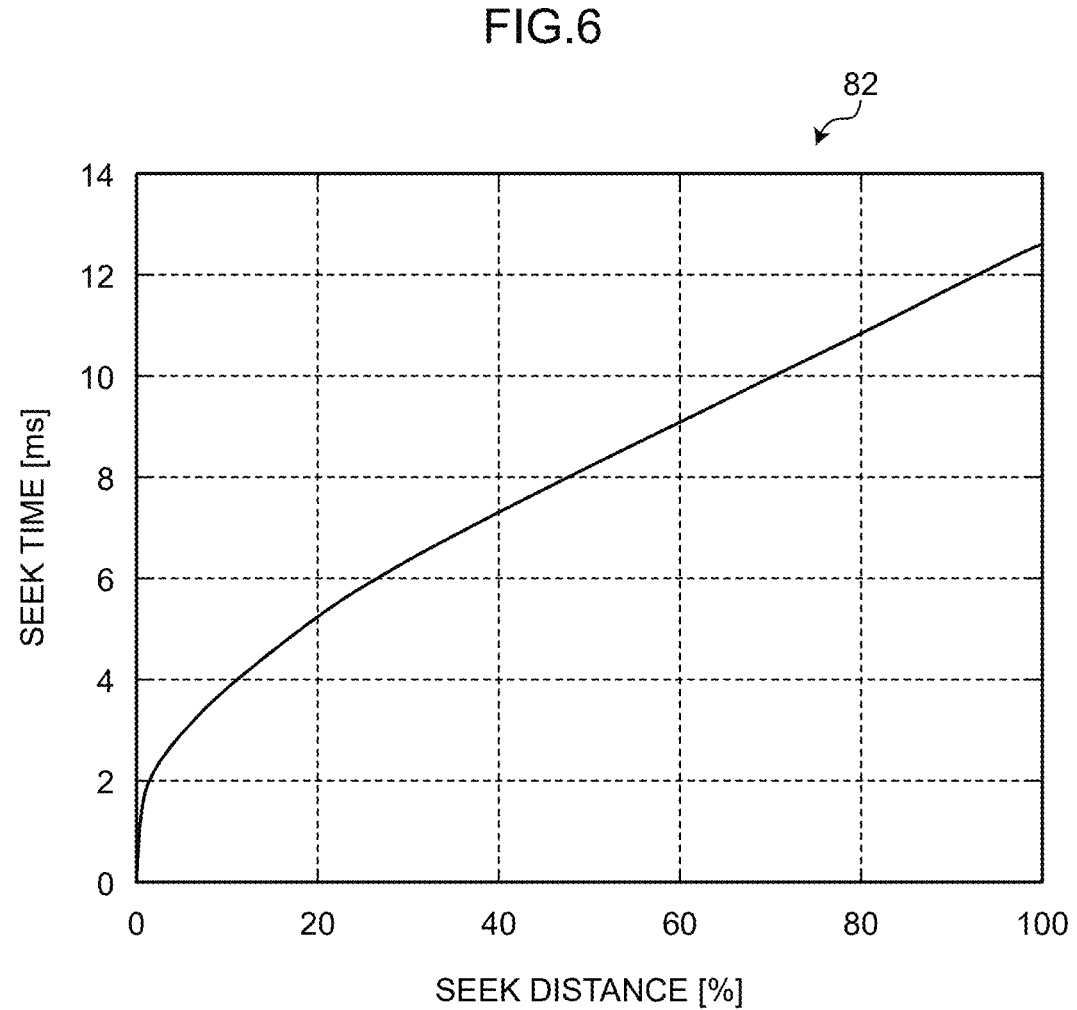
FIG. 6 is a diagram illustrating an example of a configuration of a seek profile table according to the first embodiment.

FIG. 6 is a diagram illustrating an example of a configuration of a seek profile table 82 according to the first embodiment. In the drawing, the horizontal axis represents a seek distance, and the vertical axis represents a seek time. The seek distance indicated on the horizontal axis is expressed by a percentage that denotes the maximum value of the seek distance as 100%.

As illustrated in FIG. 6, in the vicinity of the seek distance of 0%, the seek time rapidly rises as the seek distance increases. Then, the seek time increases substantially linearly in accordance with the seek distance from 20% to 100%.

The command reordering unit 61 acquires the estimated value of the seek time by using the seek profile table 82. The command reordering unit 61 corrects, based on the force constant BLst and the force constant BLds, the estimated value of the seek time acquired from the seek profile table 82.

The method of correcting the estimated value of the seek time based on the force constant BLst and the force constant BLds is not limited to a specific method. The estimated value of seek time may be corrected by multiplication of the coefficients or addition of the correction amount. Here, as one example, it is assumed that the estimated value of the seek time is corrected by multiplication of a coefficient. Hereinafter, a coefficient by which the estimated value of the seek time is multiplied is referred to as a seek correction coefficient.

The coefficient table 83 is setting information indicating a correspondence between the force constant BL and the seek correction coefficient.

Figure 7:
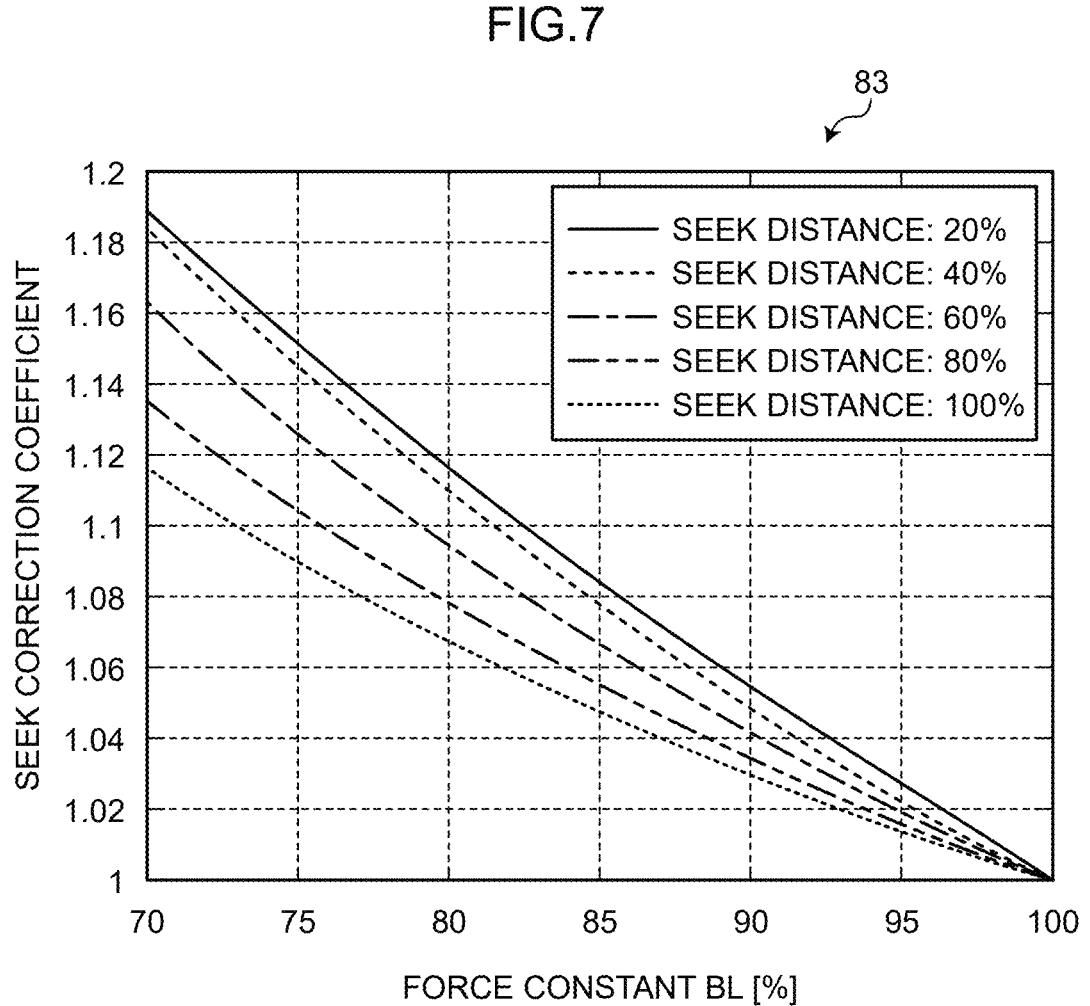
FIG. 7 is a diagram illustrating an example of a configuration of a coefficient table according to the first embodiment.

FIG. 7 is a diagram illustrating an example of a configuration of the coefficient table 83 according to the first embodiment. In the drawing, the horizontal axis represents the force constant BL, and the vertical axis represents the seek correction coefficient. The force constant BL on the horizontal axis is expressed by a percentage that denotes the maximum value of the force constant BL as 100%.

The seek correction coefficient varies with not only the force constant BL but also the seek distance. Therefore, according to the coefficient table 83, the correspondence between the force constant BL and the seek correction coefficient is defined for each value of different seek distances. Thus, the coefficient table 83 can be considered as setting information indicating a correspondence between a pair of a seek distance and a force constant and a correction coefficient.

According to the coefficient table 83, the smaller the force constant BL, the larger the seek correction coefficient under the condition that the seek distance is common. Under the condition that the force constant BL is common, the shorter the seek distance, the larger the seek correction coefficient.

The command reordering unit 61 selects, based on the seek distance, one of the correspondences defined for each seek distance of different values in the coefficient table 83. Then, the command reordering unit 61 identifies a smaller value out of the force constant BLst and the force constant BLds. The command reordering unit 61 acquires the value of the seek correction coefficient that is correlated with the value of the force constant BL identified by the selected correspondence. The command reordering unit 61 corrects the estimated value of the seek time by multiplying the estimated value of the seek time obtained by using the seek profile table 82 by the seek correction coefficient. The command reordering unit 61 uses, for estimation of the access time, a value obtained by calculation of multiplying the estimated value of the seek time by the seek correction coefficient. The estimated value of the corrected seek time used for estimating the access time is referred to as a corrected estimated value of the seek time.

Figure 8:
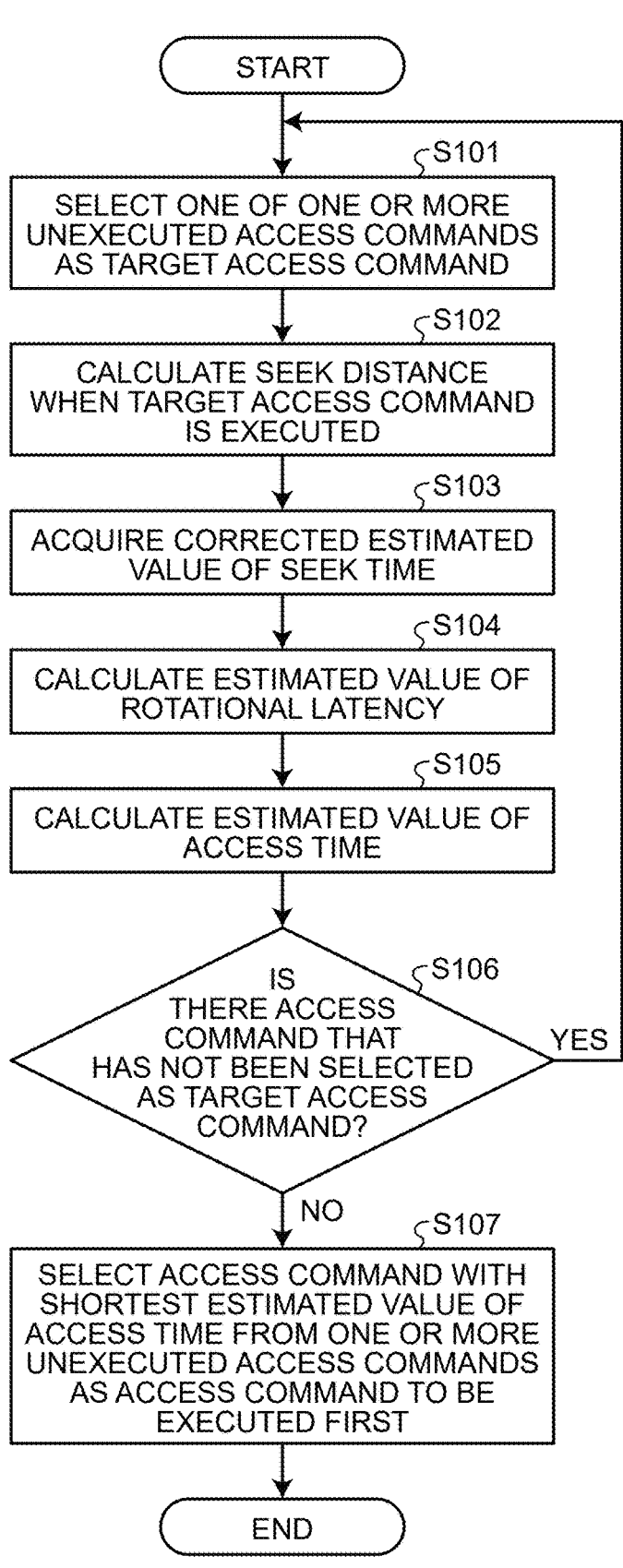
FIG. 8 is a flowchart illustrating an example of a command reordering operation according to the first embodiment.

FIG. 8 is a flowchart illustrating an example of a command reordering operation according to the first embodiment.

First, the command reordering unit 61 selects one of one or more unexecuted access commands stored in the command queue 71 (S101). The selected access command is a target for execution of the loop process configured by S101 to S106. An access command targeted for execution of the loop process is referred to as a target access command.

In S102, the command reordering unit 61 calculates a seek distance in a case where the target access command is executed. For example, when a certain access command is being executed, a distance in the radial direction from the track 17 including the access destination sector designated by the running certain access command to the track 17 including the access destination sector designated by the target access command (that is, the target track 17) is calculated as a seek distance when the target access command is executed.

Subsequently, the command reordering unit 61 acquires a corrected estimated value of the seek time (S103). Details of the processing in S103 will be described later.

After the process of S103, the command reordering unit 61 calculates an estimated value of the rotational latency (S104). For example, when an access command is being executed, the seek operation is assumed to be performed immediately after the execution of this running access command is completed, and the position of the magnetic head M H immediately after the completion of the seek operation is estimated. The command reordering unit 61 calculates the rotation amount of the magnetic disk 1 from the start to the end of the seek operation by using the corrected estimated value of the seek time obtained in S103.

The command reordering unit 61 then estimates, based on the rotation amount of the magnetic disk 1, the position where the magnetic head M H immediately after the completion of the seek operation is located from among the circumferential positions on the track 17 including the access destination sector designated by the target access command. The command reordering unit 61 estimates the rotational latency based on the circumferential distance from the estimated circumferential position to the access destination sector designated by the target access command.

The command reordering unit 61 calculates an estimated value of the access time (S105). The command reordering unit 61 acquires the estimated value of the access time by adding up the corrected estimated value of the seek time and the estimated value of the rotational latency.

The command reordering unit 61 determines whether there is an access command that has not yet been selected as the target access command from among the unexecuted access commands (S106).

In a case where there is an access command that has not yet been selected as the target access command (S106: Yes), the control transits to S101, and the command reordering unit 61 selects one of the access commands that have not yet been selected as the target access command as the target access command.

In a case where there is no access command not yet selected as the target access command (S106: No), the command reordering unit 61 selects, as an access command to be executed first, an access command corresponding to the shortest estimated value of the access time from among the unexecuted access commands stored in the command queue 71 (S107). Then, the command reordering operation ends.

Figure 9:
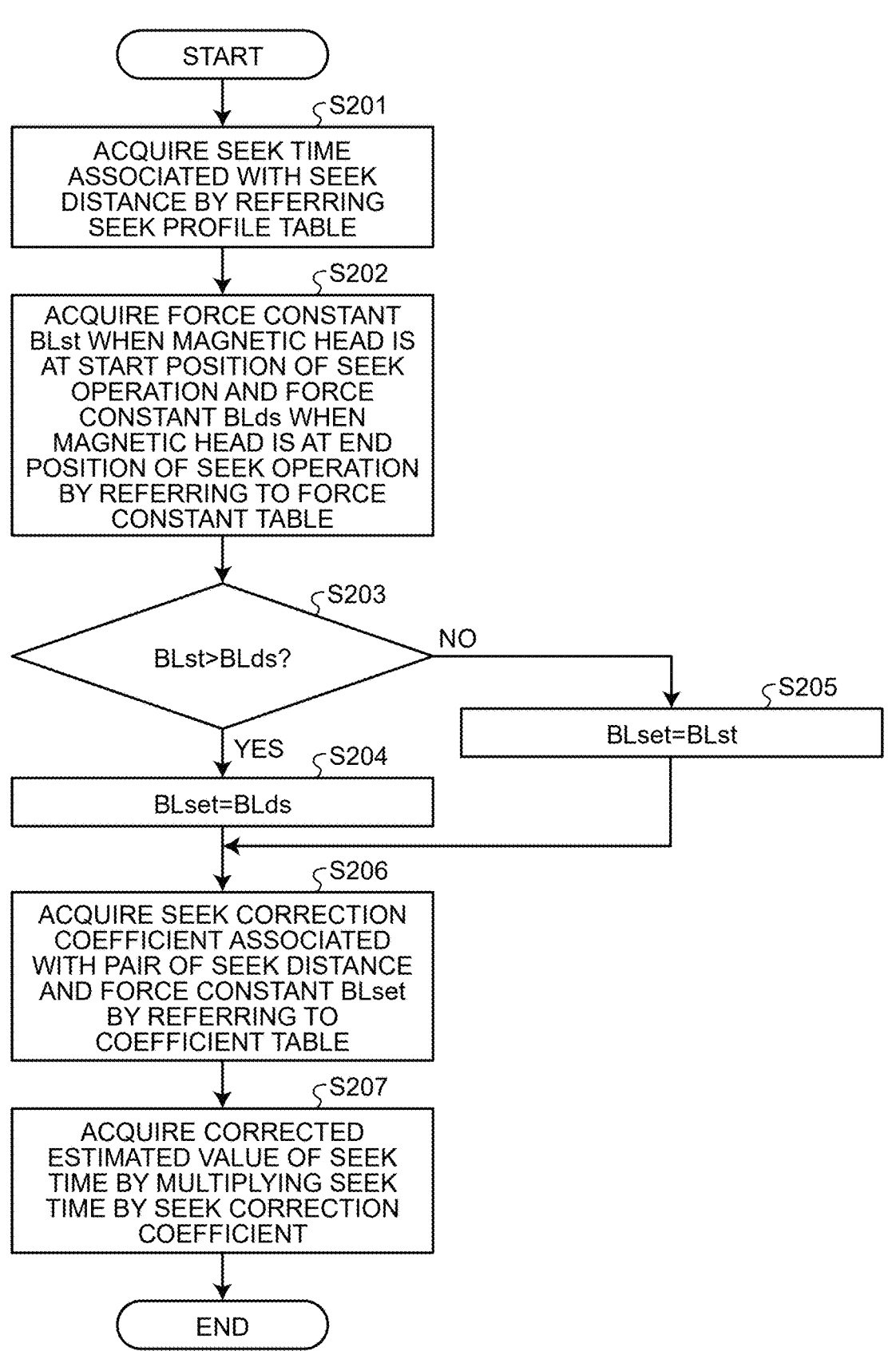
FIG. 9 is a flowchart illustrating an example of an operation to acquire a corrected estimated value of a seek time according to the first embodiment.

FIG. 9 is a flowchart illustrating an example of an operation to acquire a corrected estimated value of a seek time according to the first embodiment. The flowchart illustrated in FIG. 9 is an example of details of the process of S103 in FIG. 8.

The command reordering unit 61 first acquires a seek time correlated with the seek distance acquired by the process of S102 (FIG. 8) by using the seek profile table 82 (S201).

The command reordering unit 61 acquire the force constant BLst and the force constant BLds by using the force constant table 81 (S202). Then, the command reordering unit 61 determines whether the force constant BLst is larger than the force constant BLds (S203).

When the force constant BLst is larger than the force constant BLds (S203: Yes), the command reordering unit 61 selects the force constant BLds (S204). When the force constant BLst is equal to or less than the force constant BLds (S203: No), the command reordering unit 61 selects the force constant BLst (S205). The force constant BL selected by the process of S204 or S205 is referred to as a force constant BL set.

The command reordering unit 61 acquires, by using the coefficient table 83, a value of a seek correction coefficient corresponding to the seek distance acquired by the process of S102 (FIG. 8) and the force constant B Lset acquired by the process of S204 or S205 (S206).

The command reordering unit 61 acquires a corrected estimated value of the seek time by multiplying the seek time acquired by the process of S201 by the seek correction coefficient acquired by the process of S206 (S207). Then, the operation to correct the estimated value of the seek time ends.

Note that, in the examples illustrated in FIGS. 8 and 9, the command reordering operation is executed even when the number of unexecuted access commands stored in the command queue 71 is one. Alternatively, when the number of unexecuted access commands stored in the command queue 71 is one, the command reordering operation may not be executed, and the one unexecuted access command stored in the command queue 71 may be determined as an access command to be executed first.

In the first embodiment described above, the VCM 3 is an example of the motor. The volatile memory 7 is an example of the first memory. The nonvolatile memory 8 is an example of the second memory. The seek profile table 82 is an example of the first setting information. The processing of S102 to S105 illustrated in FIG. 8 is an example of the first operation. The seek distance obtained by the process of S102 illustrated in FIG. 8 is an example of the first distance. The corrected estimated value of the seek time obtained by the process of S103 illustrated in FIG. 8, namely, obtained by the processing illustrated in FIG. 9, is an example of the first time. The force constant BLst is an example of the first force constant. The force constant BLds is an example of the second force constant. The force constant BL set is an example of the third force constant.

As described above, in the hard disk control circuit 6 according to the first embodiment, when unexecuted access commands are stored in the command queue 71, the command reordering unit 61 acquires, for each of the unexecuted access commands, a corrected estimated value of the seek time based on the force constant BLst, the force constant BLds, and the seek distance. Then, the command reordering unit 61 determines an access command to be executed first out of the unexecuted access commands based on the corrected estimated value of the seek time obtained for each of the unexecuted access commands.

Therefore, the accuracy of estimating the seek time is improved as compared with a case where the seek time is estimated without considering the force constant BL of the VCM 3 that depends on the position of the magnetic head MH. As a result, the effect of the command reordering operation to reduce the total time required to execute the access commands is enhanced. It is possible to efficiently execute plural access commands supplied from the host 200.

In addition, according to the first embodiment, the command reordering unit 61 uses the seek profile table 82 indicating the correspondence between the seek distance and the seek time. The command reordering unit 61 acquires a seek time correlated with a seek distance in a case where the target access command is executed by the seek profile table 82 (see, for example, S201 in FIG. 9). Then, the command reordering unit 61 corrects, based on the force constant BLst and the force constant BLds, the obtained seek time to obtain a corrected estimated value of the seek time (see, for example, S202 to S207 in FIG. 9).

More specifically, according to the first embodiment, the command reordering unit 61 acquires the smaller one of the force constant BLst or the force constant BLds as the force constant BL set (see, for example, S203 to S205 in FIG. 9). The command reordering unit 61 acquires a seek correction coefficient that is correlated with the force constant BL set by the coefficient table 83 (see, for example, S206 in FIG. 9). The command reordering unit 61 multiplies the estimated value of the seek time by the seek correction coefficient to obtain the corrected estimated value of the seek time (see, for example, S207 in FIG. 9).

More specifically, the coefficient table 83 according to the first embodiment indicates a correspondence between: a pair of a seek distance and a force constant, and a seek correction coefficient. The command reordering unit 61 acquires, by using the coefficient table 83, the seek correction coefficient that is correlated with the pair of the seek distance for executing the target access command and a force constant BL set (see, for example, S206 in FIG. 9). Then, the command reordering unit 61 multiplies the estimated value of the seek time by the seek correction coefficient to obtain the corrected estimated value of the seek time (see, for example, S207 in FIG. 9).

Therefore, the accuracy of estimating the seek time is improved as compared with a case where the seek time is estimated without considering the force constant BL of the VCM 3 that depends on the position of the magnetic head MH. It is possible to efficiently execute plural access commands supplied from the host 200.

Second Embodiment

In the second embodiment, a magnetic disk device 100a acquires a corrected estimated value of a seek time by a method different from that of the first embodiment. In the second embodiment, matters different from those in the first embodiment will be described. The same matters as those in the first embodiment will not be described or will be briefly described.

Figure 10:
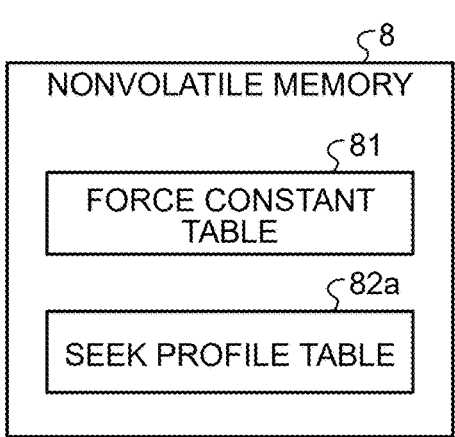
FIG. 10 is a diagram illustrating an example of setting information stored in the nonvolatile memory according to the second embodiment.

In the magnetic disk device 100a according to the second embodiment, as illustrated in FIG. 10, the force constant table 81 and a seek profile table 82a are stored in the nonvolatile memory 8.

Figure 11:
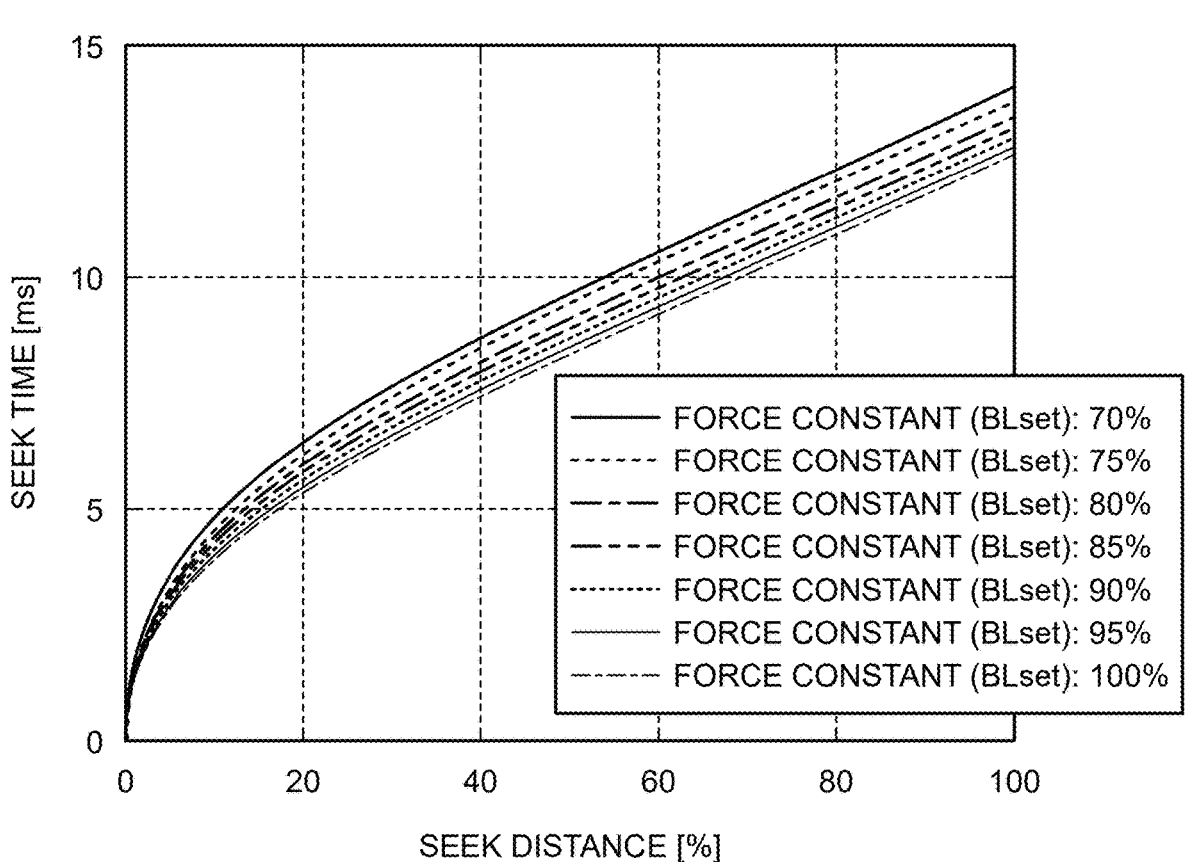
FIG. 11 is a diagram illustrating an example of a configuration of a seek profile table according to the second embodiment.

FIG. 11 is a diagram illustrating an example of a configuration of the seek profile table 82a according to the second embodiment. In the drawing, the horizontal axis represents a seek distance, and the vertical axis represents a seek time. The seek distance on the horizontal axis is expressed by a percentage that denotes the maximum value of the seek distance as 100%.

As illustrated in FIG. 11, the relationship between the seek distance and the seek time is defined for each value of the different force constants BL set.

Under a condition that the value of the force constant BL set is common, the seek time rapidly rises as the seek distance increases in the vicinity of the seek distance of 0%. The seek time increases substantially linearly in accordance with the seek distance from 20% to 100%.

Under a condition that the seek distance is common, the longer the seek time, the larger the force constant BL set.

As described above, the seek profile table 82a represents a correspondence between: a pair of the force constant BL set and the seek distance, and the seek time. The seek profile table 82a can be searched in consideration of the force constant BL set. Therefore, by using the seek profile table 82a, a value equivalent to the corrected estimated value of the seek time according to the first embodiment can be obtained.

Figure 12:
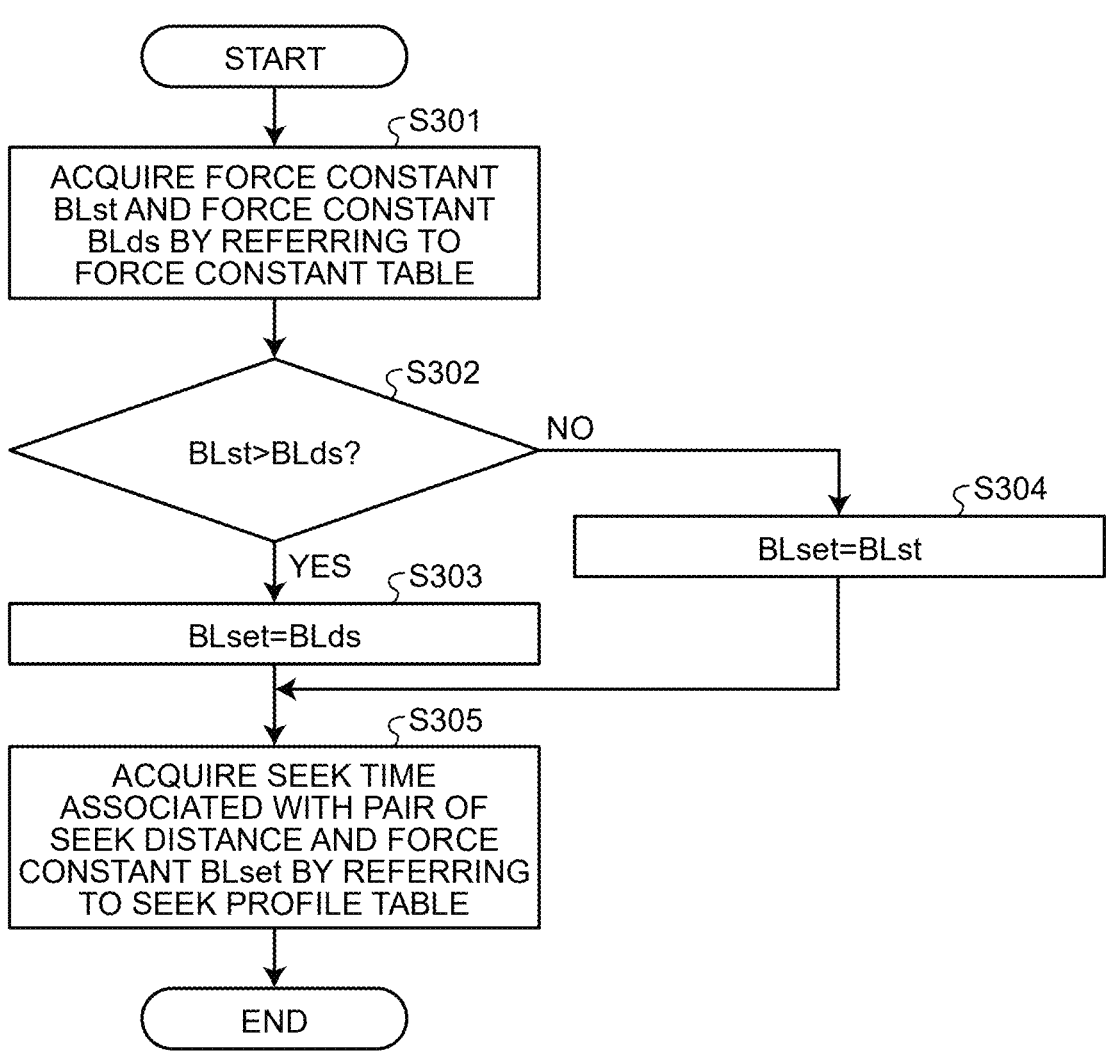
FIG. 12 is a flowchart illustrating an example of an operation to acquire an estimated value of a seek time according to the second embodiment.

FIG. 12 is a flowchart illustrating an example of an operation to acquire an estimated value of a seek time according to the second embodiment. The operation illustrated in FIG. 12 is to be executed in S103 of FIG. 8.

The command reordering unit 61 acquires the force constant BLst and the force constant BLds by using the force constant table 81 (S301). The command reordering unit 61 determines whether the force constant BLst is larger than the force constant BLds (S302).

When the force constant BLst is larger than the force constant BLds (S302: Yes), the command reordering unit 61 selects the force constant BLds as the force constant BL set (S303). When the force constant BLst is equal to or less than the force constant BLds (S302: No), the command reordering unit 61 selects the force constant BLst as the force constant BL set (S304).

The command reordering unit 61 acquires a seek time corresponding to the seek distance acquired by the process of S102 (FIG. 8) and the force constant BL set acquired by the process of S303 or S304 by using the seek profile table 82a (S305). Then, the operation to acquire the estimated value of the seek time ends.

The command reordering unit 61 recognizes the seek time acquired by the process of S305 as a corrected estimated value of the seek time and executes the process of S104 and subsequent steps illustrated in FIG. 8.

In the description of the second embodiment described above, the seek profile table 82a is an example of the third setting information.

As described above, according to the second embodiment, the command reordering unit 61 acquires the smaller one out of the force constant BLst and the force constant BLds as the force constant BL set (see, for example, S301 to S304 in FIG. 12). The command reordering unit 61 acquires the seek time correlated, by the seek profile table 82a, with the pair of the seek distance and the force constant BL set in the case of executing the target access command as the corrected estimated value of the seek time (for example, see S305 in FIG. 12).

Therefore, as in the first embodiment, it is possible to efficiently execute plural access commands supplied from the host 200.

Note that, according to the first embodiment and the second embodiment, the command reordering unit 61 estimates the rotational latency in a case where the target access command is executed (see, for example, S105 in FIG. 8), and calculates the estimated value of the access time by summing the corrected estimated value of the seek time and the estimated value of the rotational latency (see, for example, S105 in FIG. 8).

However, a method of calculating the estimated value of the access time is not limited thereto. For example, the command reordering unit 61 may recognize the corrected estimated value of the seek time as the access time and determine an access command to be executed first out of unexecuted access commands.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head configured to access the magnetic disk;
   a motor configured to execute a seek operation to move the magnetic head in a radial direction of the magnetic disk;
   a first memory configured to store commands, each being unexecuted and each requesting an access to the magnetic disk; and
   a controller configured to execute, for each of the commands, a first operation to estimate a first time required for a seek operation for executing a corresponding command, the first operation including
      acquiring a first force constant and a second force constant, the first force constant being a force constant of the motor determined when the magnetic head is at a start position of the seek operation for executing the corresponding command, the second force constant being a force constant of the motor determined when the magnetic head is at an end position of the seek operation for executing the corresponding command, and
      estimating the first time based on the first force constant, the second force constant, and a first distance being a movement distance of the magnetic head by the seek operation for executing the corresponding command, and
   determine a command to be executed first out of the commands based on an estimated value of the first time obtained by the first operation executed for each of the commands.

2. The magnetic disk device according to claim 1, further comprising a second memory configured to store first setting information indicating a correspondence between a movement distance of the magnetic head by a seek operation and a time required for the seek operation,
   wherein the controller is configured to, in the first operation,
      acquire, as an intermediate calculation value, a time correlated with the first distance by the first setting information, and
      acquire an estimated value of the first time by correcting the intermediate calculation value based on the first force constant and the second force constant.

3. The magnetic disk device according to claim 2, wherein the second memory is configured to store second setting information indicating a correspondence between a force constant and a correction coefficient, and
   the controller is configured to, in the first operation,
      identify a third force constant being a smaller one of the first force constant or the second force constant,
      acquire a correction coefficient correlated with the third force constant by the second setting information, and
      acquire the estimated value of the first time by multiplying the acquired correction coefficient by the intermediate calculation value.

4. The magnetic disk device according to claim 3, wherein the second setting information indicates a correspondence between: a pair of a movement distance of the magnetic head by a seek operation and a force constant, and a correction coefficient, and
   the controller is configured to, in the first operation,
      acquire a correction coefficient correlated with a pair of the first distance and the third force constant by the second setting information, and
      acquire the estimated value of the first time by multiplying the acquired correction coefficient by the intermediate calculation value.

5. The magnetic disk device according to claim 1, further comprising a second memory configured to store third setting information indicating a correspondence between: a pair of a movement distance of the magnetic head by a seek operation and a force constant, and a time required for the seek operation,
   wherein the controller is configured to, in the first operation, identify a third force constant being a smaller one of the first force constant or the second force constant, and acquire, as an estimated value of the first time, a time correlated with a pair of the first distance and the third force constant by the third setting information.

6. The magnetic disk device according to claim 1, wherein the controller is configured to estimate, for each of the commands, a second time required to wait for rotation, calculate, for each of the commands, a total value of an estimated value of the first time and an estimated value of the second time, and determine, as the command to be executed first, a command corresponding to the smallest total value among the commands.

7. The magnetic disk device according to claim 2, wherein the controller is configured to estimate, for each of the commands, a second time required to wait for rotation, calculate, for each of the commands, a total value of an estimated value of the first time and an estimated value of the second time, and determine, as the command to be executed first, a command corresponding to the smallest total value among the commands.

8. The magnetic disk device according to claim 3, wherein the controller is configured to estimate, for each of the commands, a second time required to wait for rotation, calculate, for each of the commands, a total value of an estimated value of the first time and an estimated value of the second time, and determine, as the command to be executed first, a command corresponding to the smallest total value among the commands.

9. The magnetic disk device according to claim 4, wherein the controller is configured to estimate, for each of the commands, a second time required to wait for rotation, calculate, for each of the commands, a total value of an estimated value of the first time and an estimated value of the second time, and determine, as the command to be executed first, a command corresponding to the smallest total value among the commands.

10. The magnetic disk device according to claim 5, wherein the controller is configured to estimate, for each of the commands, a second time required to wait for rotation, calculate, for each of the commands, a total value of an estimated value of the first time and an estimated value of the second time, and determine, as the command to be executed first, a command corresponding to the smallest total value among the commands.

11. A method of controlling a magnetic disk device, the magnetic disk device including a magnetic disk, a magnetic head accessing the magnetic disk, and a motor executing a seek operation to move the magnetic head in a radial direction of the magnetic disk, the method comprising:

executing, for each of commands, a first operation to estimate a first time required for a seek operation for executing a corresponding command, the commands each being unexecuted and each requesting an access to the magnetic disk, the first operation including acquiring a first force constant and a second force constant, the first force constant being a force constant of the motor determined when the magnetic head is at a start position of the seek operation for executing the corresponding command, the second force constant being a force constant of the motor determined when the magnetic head is at an end position of the seek operation for executing the corresponding command, and estimating the first time based on the first force constant, the second force constant, and a first distance being a movement distance of the magnetic head by the seek operation for executing the corresponding command; and determining a command to be executed first out of the commands based on an estimated value of the first time obtained by the first operation executed for each of the commands.

12. The method according to claim 11, wherein the first operation further includes acquiring, as an intermediate calculation value, a time correlated with the first distance by first setting information, the first setting information indicating a correspondence between a movement distance of the magnetic head by a seek operation and a time required for the seek operation, and acquiring an estimated value of the first time by correcting the intermediate calculation value based on the first force constant and the second force constant.

13. The method according to claim 12, wherein the first operation further includes identifying a third force constant being a smaller one of the first force constant or the second force constant, acquiring a correction coefficient correlated with the third force constant by second setting information, the second setting information indicating a correspondence between a force constant and a correction coefficient, and acquiring the estimated value of the first time by multiplying the acquired correction coefficient by the intermediate calculation value.

14. The method according to claim 13, wherein the second setting information indicates a correspondence between: a pair of a movement distance of the magnetic head by a seek operation and a force constant, and a correction coefficient, and the first operation further includes acquiring a correction coefficient correlated with a pair of the first distance and the third force constant by the second setting information, and acquiring the estimated value of the first time by multiplying the acquired correction coefficient by the intermediate calculation value.

15. The method according to claim 11, wherein the first operation further includes identifying a third force constant being a smaller one of the first force constant or the second force constant, and acquiring, as an estimated value of the first time, a time correlated with a pair of the first distance and the third force constant by third setting information, the third setting information indicating a correspondence between: a pair of a movement distance of the magnetic head by a seek operation and a force constant, and a time required for the seek operation.

16. The method according to claim 11, further comprising:

estimating, for each of the commands, a second time required to wait for rotation;

calculating, for each of the commands, a total value of an estimated value of the first time and an estimated value of the second time; and determining, as the command to be executed first, a command corresponding to the smallest total value among the commands.

17. The method according to claim 12, further comprising:

estimating, for each of the commands, a second time required to wait for rotation;

calculating, for each of the commands, a total value of an estimated value of the first time and an estimated value of the second time; and determining, as the command to be executed first, a command corresponding to the smallest total value among the commands.

18. The method according to claim 13, further comprising:

estimating, for each of the commands, a second time required to wait for rotation;

calculating, for each of the commands, a total value of an estimated value of the first time and an estimated value of the second time; and

determining, as the command to be executed first, a command corresponding to the smallest total value among the commands.

19. The method according to claim 14, further comprising:

estimating, for each of the commands, a second time required to wait for rotation;

calculating, for each of the commands, a total value of an estimated value of the first time and an estimated value of the second time; and determining, as the command to be executed first, a command corresponding to the smallest total value among the commands.

20. The method according to claim 15, further comprising:

estimating, for each of the commands, a second time required to wait for rotation;

calculating, for each of the commands, a total value of an estimated value of the first time and an estimated value of the second time; and determining, as the command to be executed first, a command corresponding to the smallest total value among the commands.

* * * * *